US008613978B2

(12) United States Patent  
Aravamudan

(10) Patent No.: US 8,613,978 B2  
(45) Date of Patent: Dec. 24, 2013

(54) IN SITU FOAMING IN ARTIFICIAL STONE

(76) Inventor: Gosakan Aravamudan, Bangalore (IN)

( * ) Notice: Subject to any disclaimer, the term of this patent is extended or adjusted under 35 U.S.C. 154(b) by 204 days.

(21) Appl. No.: 13/201,622

(22) PCT Filed: Feb. 17, 2010

(86) PCT No.: PCT/IN2010/000092  
§ 371 (c)(1),  
(2), (4) Date: Aug. 16, 2011

(87) PCT Pub. No.: WO2010/103535  
PCT Pub. Date: Sep. 16, 2010

(65) Prior Publication Data  
US 2011/0300300 A1    Dec. 8, 2011

(30) Foreign Application Priority Data  
Feb. 20, 2009  (IN) .............................. 381/CHE/2009

(51) Int. Cl.  
*B05D 3/02*   (2006.01)

(52) U.S. Cl.  
USPC ............ 427/373; 52/309.4; 156/61; 156/382; 427/346; 427/350; 427/201

(58) Field of Classification Search  
USPC ............ 427/346, 350, 373, 600; 428/67, 143, 428/196, 201, 206, 208; 52/309.3, 309.4; 156/39–46, 60, 63, 212–216, 285–286, 156/382; 264/239, 259, 260, 271.1, 279, 264/279.1, 300, 339  
See application file for complete search history.

(56) References Cited

U.S. PATENT DOCUMENTS

| | | | |
|---|---|---|---|
| 2005/0281999 A1* | 12/2005 | Hofmann et al. | 428/304.4 |
| 2006/0257580 A1* | 11/2006 | Ranganathan et al. | 427/412.1 |
| 2008/0187739 A1* | 8/2008 | Baker et al. | 428/297.7 |

FOREIGN PATENT DOCUMENTS

CN    1673164 A    9/2005

* cited by examiner

*Primary Examiner* — Alexander Weddle  
(74) *Attorney, Agent, or Firm* — Ash Tankha; Lipton, Weinberger & Husick

(57) ABSTRACT

A method of manufacturing a body structure for a door or other furniture is provided. A skeletal framework is placed on an uncured artificial stone mix deposited on a release sheet placed on a surface. Liquid structural foam is introduced within the skeletal framework. The skeletal framework is wrapped with the release sheet comprising the uncured artificial stone mix such that the skeletal framework is completely covered with the uncured artificial stone mix. The wrapped skeletal framework is placed in a chamber of a defined volume. The uncured artificial stone mix is compressed by the expanding liquid structural foam and conforms to the internal shape of the chamber. The foaming action generates heat that accelerates curing of the uncured artificial stone mix to create an outer cured artificial stone skin of the body structure. After removal from the chamber, the release sheet is separated and the body structure is polished.

8 Claims, 7 Drawing Sheets

IN SITU FOAMING IN ARTIFICIAL STONE

CROSS REFERENCE TO RELATED APPLICATIONS

This application claims the benefit of the following patent applications:
1. Provisional patent application number 381/CHE/2009 titled "In Situ Foaming In Artificial Stone", filed on Feb. 20, 2009 in the Indian Patent Office.
2. PCT application number PCT/IN2010/000092 titled "In Situ Foaming In Artificial Stone", filed on Feb. 17, 2010 in the Indian Patent Office.

The specifications of the above referenced patent applications are incorporated herein by reference in their entirety.

BACKGROUND

This invention, in general, relates to furnishing products. More particularly, this invention relates to a body structure for a door or other furniture made of artificial stone.

Modern furniture and doors are most commonly made of wood, metals or plastics. The most common material used for doors and furniture is wood. Wood has several limitations, for example, wood is expensive, requires regular maintenance to protect the wood from termites, its accruing cost of fabrication, etc. Furthermore, the construction of wooden doors and windows may require skilled labor. Wood is also susceptible to weather, and constant usage causes wear and tear. Wood also requires cutting of trees which makes it harmful to the environment. If colored images are to be applied on wood, the colored images have to be applied in the form of coatings. However, coatings on wood or its derivatives have a limited life. These coatings may discolor or peel off. Wood is not amenable to be worked into a variety of surface textures.

Metal is hard and needs extensive energy to mine the raw materials and manufacture doors and furniture. Metal furniture and doors have several limitations, for example, metal products are heavy, require regular maintenance to protect them from rusting, the accruing cost of fabrication, etc. Furthermore, metals are susceptible to weather conditions and may get rusted if they are not maintained regularly. Plastics may be used to make furniture and doors; however plastics lack the sturdiness offered by metal and wooden structures. Plastic doors and furniture have reduced durability, and can easily be damaged by excessive heat or cold.

Furthermore, there is a need for materials that possess properties, for example, abrasion resistance, dirt resistance, moisture resistance, shock resistance, fire resistance, frost resistance, thermal shock resistance, stain resistance, chemical resistance, and color permanence in order to achieve long durability. Therefore, there is a need for manufacturing an alternative material to make a body structure for a door or other furniture.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method disclosed herein addresses the above stated needs for manufacturing an alternative material to make a body structure for a door or other furniture. A layer of a release sheet, for example, a polyethylene terephthalate sheet, a plastic sheet, a silicone rubber sheet, or a rubber sheet, is placed on a surface. An uncured artificial stone mix comprising, for example, glass fiber is deposited on the release sheet. After deposition of the uncured artificial stone mix on the release sheet, pressure and a backing of glass fiber and resin are applied to the deposited uncured artificial stone mix. The glass fiber is applied as a glass fiber mat on the deposited uncured artificial stone mix. The uncured artificial stone mix may be subjected to vibration. A skeletal framework made of, for example, metal, wood, plastic, paper honeycomb, composite honeycomb, metal honeycomb, or a composite, is placed on the uncured artificial stone mix. Liquid structural foam is introduced within the skeletal framework. In an embodiment, one or more of porous ceramic blocks, pieces of solid structural foam, paper honeycomb, a metal grid, a metal layer, etc. are introduced within the skeletal framework prior to the introduction of the liquid structural foam. The skeletal framework is wrapped with the release sheet comprising the uncured artificial stone mix such that the skeletal framework is completely covered with the uncured artificial stone mix. The skeletal framework is enveloped on one or all sides by the uncured artificial stone mix thereby creating an enclosed space within which the liquid structural foam is contained for foaming.

The wrapped skeletal framework is placed in a chamber with a defined volume. The foaming of the liquid structural foam generates heat that accelerates curing of the uncured artificial stone mix. The liquid structural foam also creates high pressure that compresses the uncured artificial stone mix. The liquid structural foam expands and makes the uncured artificial stone mix to conform to the internal shape of the chamber. A vacuum may be applied to remove air cavities in the uncured artificial stone mix while the liquid structural foam is expanding and compressing the uncured artificial stone mix. The uncured artificial stone mix is allowed to cure, thereby creating an outer cured artificial stone skin constituting one or more of a top surface, a bottom surface, and side surfaces of the body structure.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
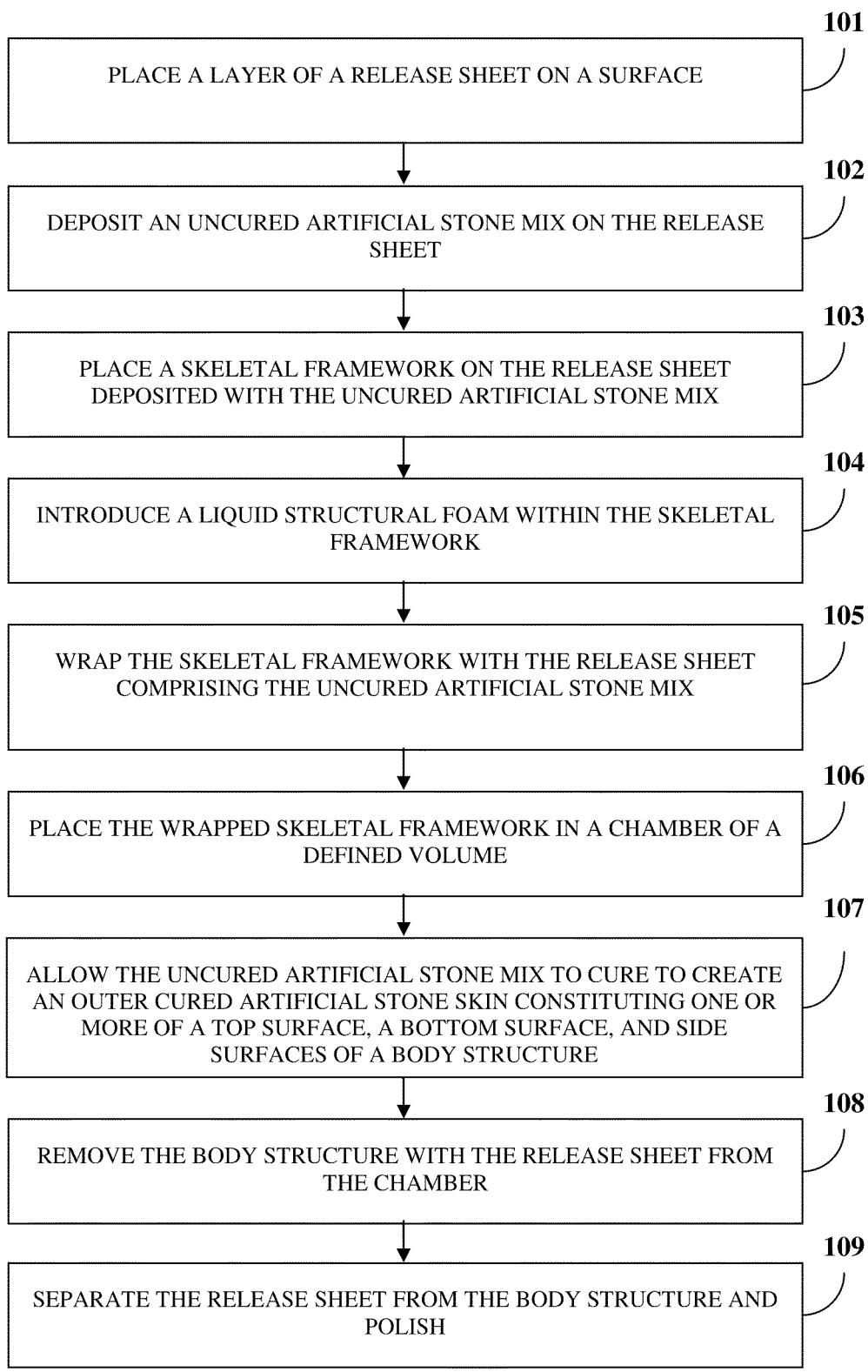
FIG. 1 illustrates a method of manufacturing a body structure for a door or other furniture.
Figure 2:
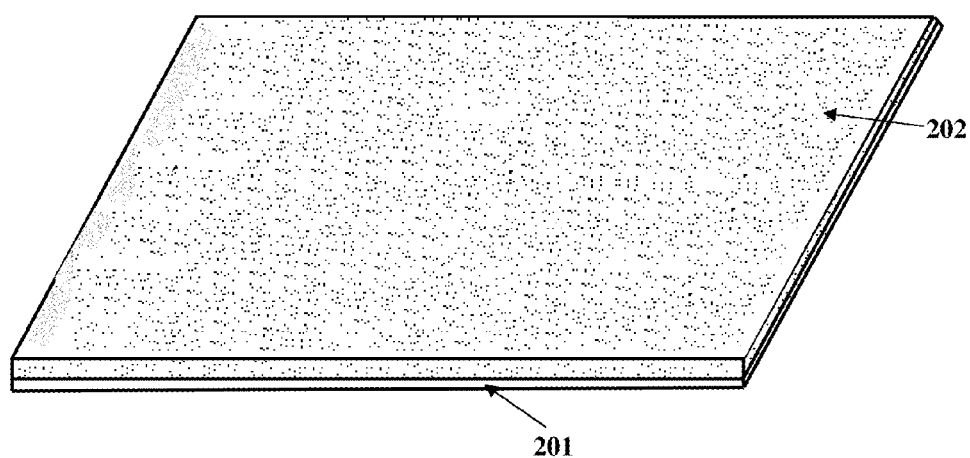
FIG. 2 exemplarily illustrates an uncured artificial stone mix deposited on a release sheet.

FIG. 1 illustrates a method of manufacturing a body structure for a door or other furniture. A method of manufacturing the body structure disclosed herein comprises placing 101 a layer of a release sheet on a surface, depositing 102 an uncured artificial stone mix on the release sheet, placing 103 a skeletal framework on the release sheet deposited with the uncured artificial stone mix, introducing 104 a liquid structural foam inside the skeletal framework, wrapping 105 the skeletal framework with the release sheet comprising the uncured artificial stone mix such that the skeletal framework is completely covered with the uncured artificial stone mix, placing 106 the wrapped skeletal framework inside a chamber of a defined volume, allowing 107 the uncured artificial stone mix to cure, thereby creating an outer cured artificial stone skin constituting one or more of a top surface, a bottom surface, and side surfaces of the body structure, removing 108 the body structure with the release sheet from the chamber, and separating 109 the release sheet from the body structure and polishing the body structure.

FIGS. 2-7 exemplarily illustrate the steps of manufacturing the body structure 700. A layer of a release sheet 201 is placed on a surface. The release sheet 201 is, for example, one or more of a polyethylene terephthalate sheet, a plastic sheet, a silicone rubber sheet, a rubber sheet, etc. A reinforcing sheet, for example, a metal wire grid or a glass fiber mat may reinforce one side of the release sheet 201. An uncured artificial stone mix 202 is deposited on the release sheet 201 as exemplarily illustrated in FIG. 2. Pressure may be applied on the deposited uncured artificial stone mix 202. The uncured artificial stone mix 202 may be compacted with a heavy roller. The uncured artificial stone mix 202 constitutes one or more of the top, bottom or side surfaces of the body structure 700 upon curing. A layer of fiber and resin may be applied on the compacted uncured artificial stone mix 202. The fiber is, for example, one or a combination of glass fibers, carbon fibers, ceramic fibers, metal wires, aramid yarn, etc. Short glass fibers may also be introduced within the uncured artificial stone mix 202. In an embodiment, the glass fiber is applied as a glass fiber mat on the deposited uncured artificial stone mix 202.

Figure 3:
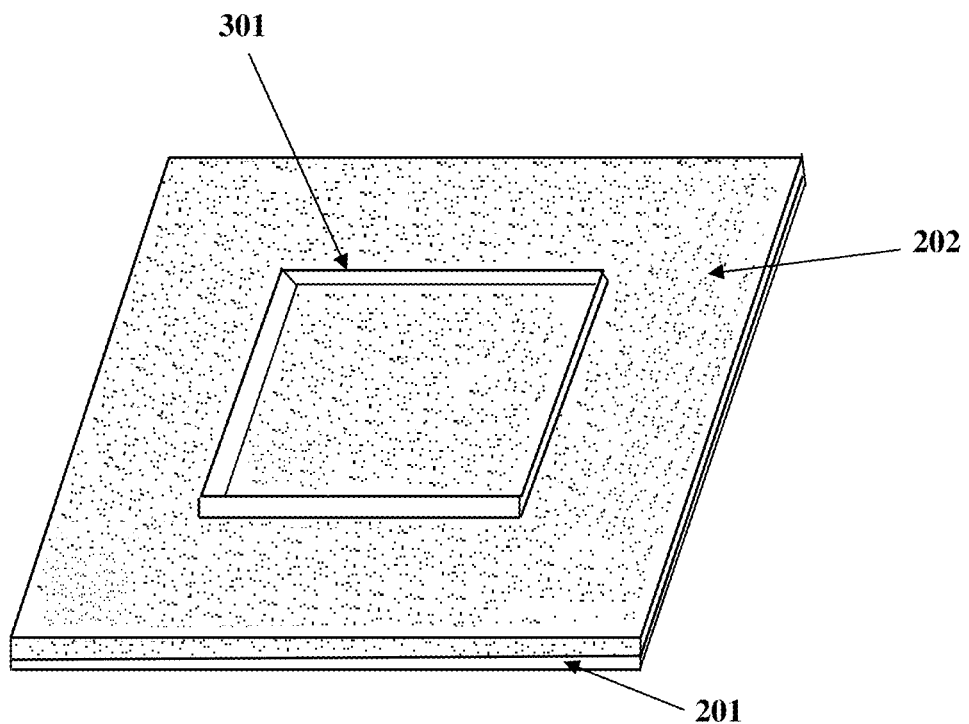
FIG. 3 exemplarily illustrates a skeletal framework placed on the uncured artificial stone mix.
Figure 4:
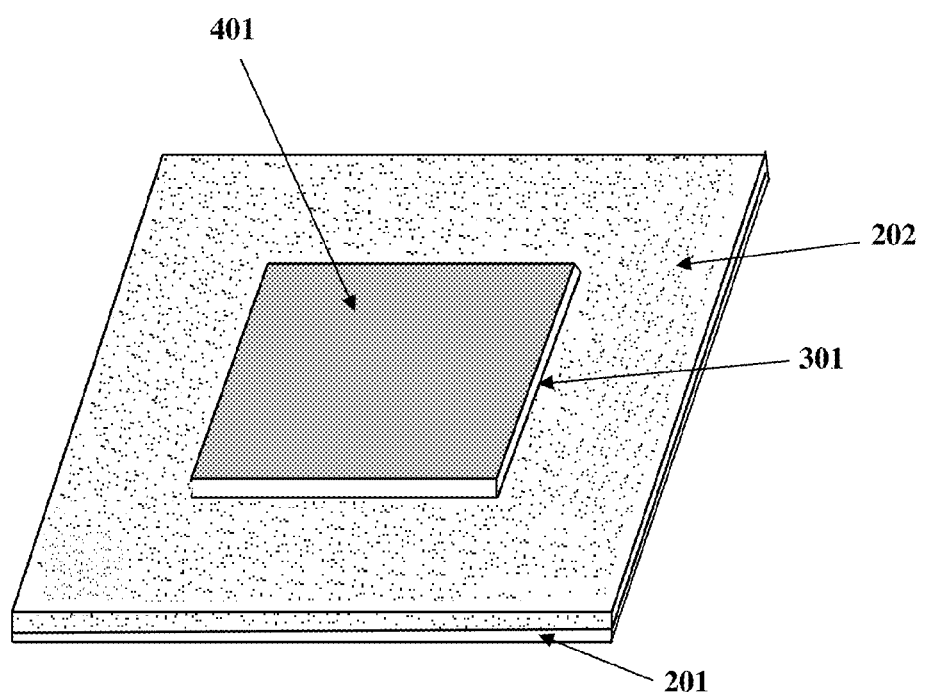
FIG. 4 exemplarily illustrates the skeletal framework filled with liquid structural foam on the uncured artificial stone mix.

A skeletal framework 301 is placed on the deposited uncured artificial stone mix 202 as exemplarily illustrated in FIG. 3. The skeletal framework 301 is, for example, made of metal, wood, plastic, paper honeycomb, composite honeycomb, metal honeycomb, a composite, etc. Liquid structural foam 401 is introduced within the skeletal framework 301 placed over the uncured artificial stone mix 202 as exemplarily illustrated in FIG. 4. The liquid structural foam 401 is a combination of a polyisocyanate and a polyol. One or more of porous ceramic blocks, pieces of solid structural foam, paper honeycomb, a metal grid, and a metal layer may be introduced within the skeletal framework 301 prior to the introduction of the liquid structural foam 401. The liquid structural foam 401 acts as the binder and forms a composite central core.

Figure 5:
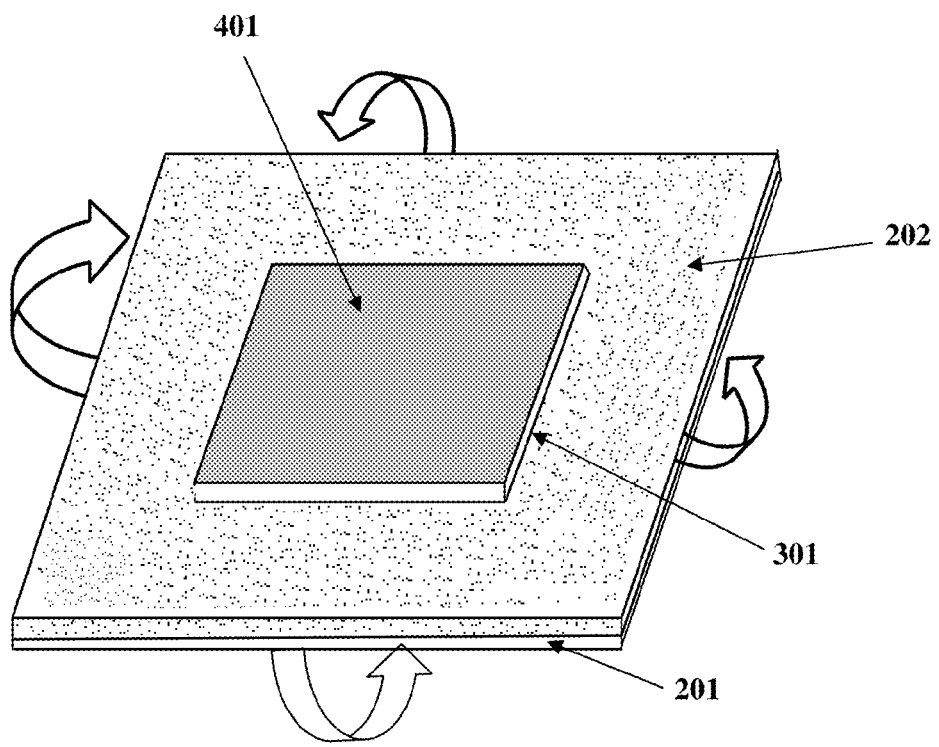
FIG. 5 exemplarily illustrates wrapping the skeletal framework with the release sheet comprising the uncured artificial stone mix.
Figure 6:
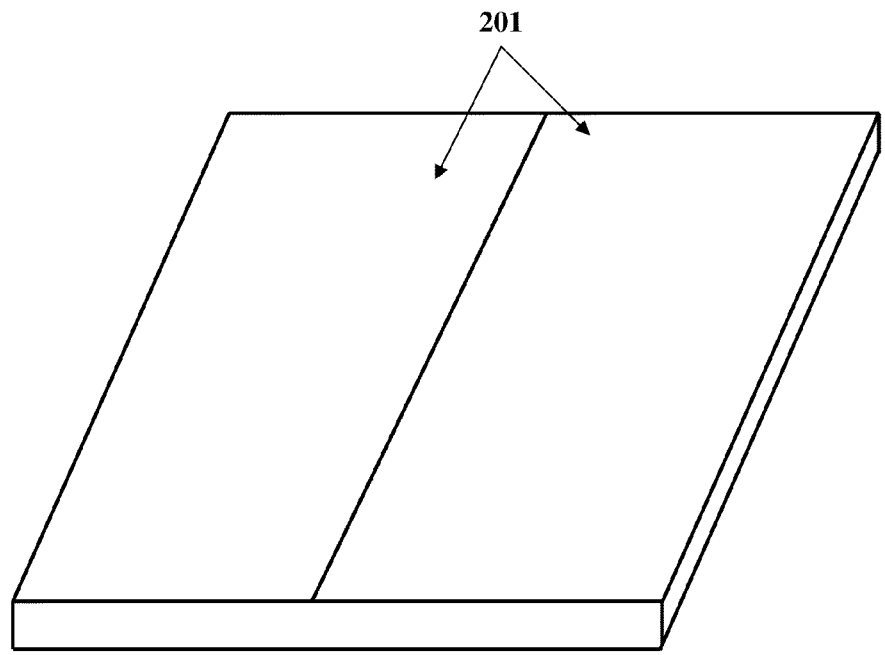
FIG. 6 exemplarily illustrates the wrapped skeletal framework.
Figure 7:
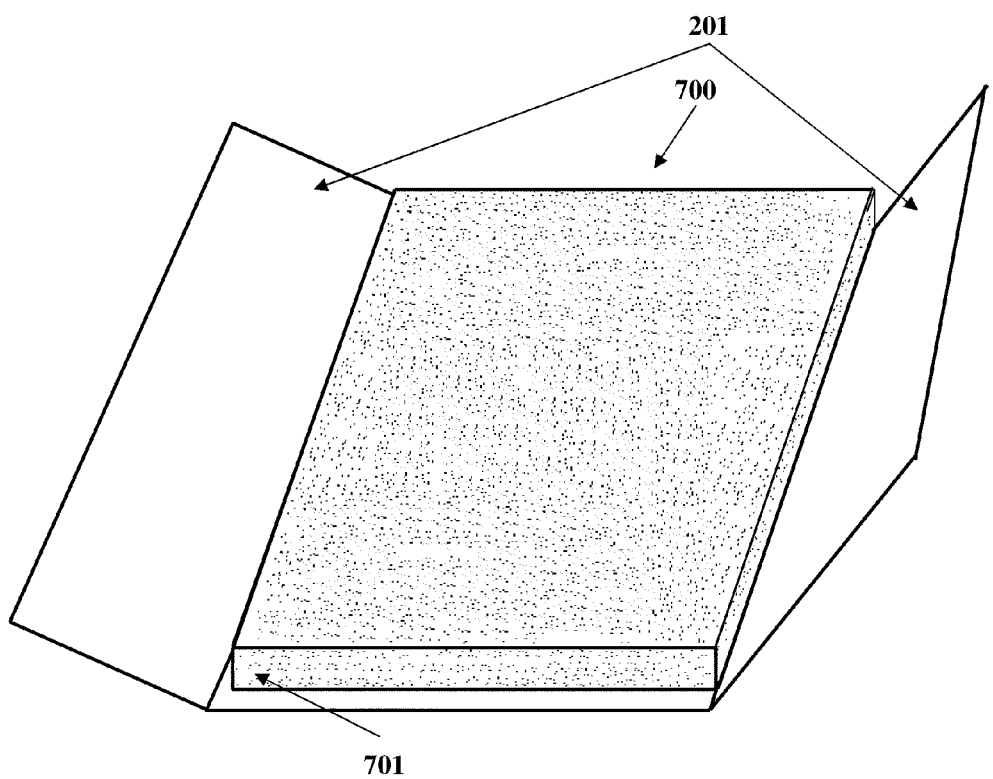
FIG. 7 exemplarily illustrates the body structure with an outer cured artificial stone skin on separation of the release sheet.

The skeletal framework 301 is wrapped with the release sheet 201 comprising the uncured artificial stone mix 202 as exemplarily illustrated in FIG. 5 such that the skeletal framework 301 is completely covered with the uncured artificial stone mix 202. The skeletal framework 301 is completely enveloped by the release sheet 201 as exemplarily illustrated in FIG. 6. The wrapped skeletal framework 301 creates an enclosed space within which the liquid structural foam 401 is contained for foaming. The wrapped skeletal framework 301 is placed in a chamber with a defined volume. The liquid structural foam 401 begins to foam which generates heat that accelerates curing of the uncured artificial stone mix 202, creates high pressure that compresses the uncured artificial stone mix 202, and makes the uncured artificial stone mix 202 to conform to the internal shape of the chamber. A vacuum may be applied to remove air cavities in the uncured artificial stone mix 202 while the liquid structural foam 401 is expanding and compressing the uncured artificial stone mix 202. The uncured artificial stone mix 202 is allowed to cure at room temperature or at elevated temperatures, thereby creating an outer cured artificial stone skin 701 constituting one or more of a top surface, a bottom surface, and side surfaces of the body structure 700. The body structure 700 with the release sheet 201 is removed from the chamber. After removal from the chamber, the release sheet 201 is separated from the body structure 700 with the outer cured artificial stone skin 701 as exemplarily illustrated in FIG. 7.

The uncured artificial stone mix 202 is subjected to vibration for improved compaction. The compressive force of the expanding liquid structural foam 401 and the vibratory motion aid in eliminating air pockets and increase the density and strength of the cured artificial stone skin 701. The artificial stone mix 202 may be reinforced with glass fibers 202.

The uncured artificial stone mix 202 further comprises particulates and resin. The particulates are, for example, composed of quartz, or composed of one or more of quartz, granite, glass, ceramic, etc. The size of the particulates may vary, for example, from a fine powder to 4 millimeters (mm). The size distribution may follow Fuller's formula so as to achieve maximum compaction.

The resin system used in the uncured artificial stone mix 202 may be an unsaturated polyester resin. An example of an unsaturated polyester resin is a combination of iso-neopentyl glycol (80% by weight) and styrene (20% by weight). Another example of an unsaturated polyester resin is a combination of iso-neopentyl glycol, methyl acrylate, and styrene. Room temperature catalysts, for example, methyl ethyl ketone peroxide (MEKP) and room temperature accelerators may be used for curing. In another embodiment, high temperature setting catalysts, for example, dimethyl aniline (DMA) may be used for curing. In the resin system, other ingredients, for example, a dispersing agent, a stabilizing agent, a coupling agent, pigments, etc. are used for dispersion of fillers and pigments, and for providing a stronger bonding of fillers or reinforcements to the unsaturated polyester resin. The uncured artificial stone mix 202 may also be a cement based mix.

Tables 1-3 below are working examples of compositions for the uncured artificial stone mix 202.

TABLE 1

| Ingredient | Parts by weight |
| --- | --- |
| Unsaturated polyester resin (Iso-neopentyl glycol, styrene monomer, methyl methacrylate monomer) | 11 |
| Quartz (particles size <4.0 mm) | 87 |
| Benzoyl peroxide | 1 |
| Dimethyl aniline (DMA) | 1 |

Curing is carried out at 70 deg C. for 15 minutes.

TABLE 2

| Ingredient | Parts by weight |
| --- | --- |
| Unsaturated polyester resin (Iso-neopentyl glycol, styrene monomer) | 13 |
| Quartz (particles size <3.0 mm) | 85 |
| Benzoyl peroxide | 1.0 |
| Dimethyl aniline (DMA) | 1.0 |

Curing is carried out at 70 deg C. for 15 minutes.

TABLE 3

| Ingredient | Parts by weight |
| --- | --- |
| Unsaturated polyester resin (Iso-neopentyl glycol, styrene monomer, methyl methacrylate monomer) | 10 |
| Quartz (particles size <3.0 mm) | 88 |
| Methyl ethyl ketone peroxide (MEKP) | 1.0 |
| Cobalt naphthenate | 1.0 |

Curing is carried out at room temperature.

The liquid structural foam 401 comprises, for example, diphenylmethane diisocyanate (MDI) and polyether polyol. In order to prepare the liquid structural foam 401, calculated quantities of polyol, polyisocyanate, and water are mixed thoroughly using a stirrer, and poured immediately over the intended areas and spread evenly over the surface.

Tables 4-5 below illustrate working examples of compositions for a polyurethane foaming liquid.

TABLE 4

| Ingredient | Parts by weight |
| --- | --- |
| Polyol | 40 |
| Polyisocyanate | 60 |

TABLE 5

| Ingredient | Parts by weight |
| --- | --- |
| Polyol | 48 |
| Polyisocyanate | 52 |

Optionally, the final step in the manufacture of the body structure 700 may also comprise compressing the uncured artificial stone mix 202. Pressure may be applied on the deposited uncured artificial stone mix 202. The compressing pressure is applied, for example, by a heavy roller or by a vibrating compactor. The compactor is a hydraulic or a pneumatic compactor and may apply a pressure in a range of, for example, about 1 kg/cm$^2$ to about 10 kg/cm$^2$, on the body structure 700. The cured artificial stone mix 701 is polished using conventional techniques of granite polishing.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method of manufacturing a body structure for a door or other furniture, comprising:
   placing a layer of a release sheet on a surface;
   depositing an uncured artificial stone mix on said release sheet;
   placing a skeletal framework on said uncured artificial stone mix;
   introducing liquid structural foam within said skeletal framework;
   wrapping said release sheet over said skeletal framework, wherein said deposited uncured artificial stone mix on said release sheet completely covers said skeletal framework;
   placing said wrapped skeletal framework in a chamber of a defined volume, whereby foaming of said liquid structural foam generates heat that accelerates curing of said uncured artificial stone mix, creates high pressure that compresses said uncured artificial stone mix, and makes said uncured artificial stone mix to conform to shape of said chamber; and
   curing said uncured artificial stone mix, thereby creating an outer cured artificial stone skin constituting one or more of a top surface, a bottom surface, and side surfaces of said body structure.

2. The method of claim 1, further comprising introducing one or more of porous ceramic blocks, pieces of solid structural foam, paper honeycomb, a metal grid, and a metal layer within said skeletal framework prior to said introduction of said liquid structural foam.

3. The method of claim 1, wherein said release sheet is one or more of a polyethylene terephthalate sheet, a plastic sheet, a silicone rubber sheet, and a rubber sheet.

4. The method of claim 1, wherein said skeletal framework is made of one of metal, wood, plastic, paper honeycomb, composite honeycomb, metal honeycomb, and a composite.

5. The method of claim 1, wherein after said deposition of said uncured artificial stone mix on said release sheet, the following additional processes are exercised:
   applying pressure on said deposited uncured artificial stone mix; and
   applying a backing of glass fiber and resin to said deposited uncured artificial stone mix.

6. The method of claim 5, wherein said glass fiber is applied as a glass fiber mat on said deposited uncured artificial stone mix.

7. The method of claim 1, wherein said uncured artificial stone mix is subjected to vibration.

8. The method of claim 1, further comprising applying a vacuum to remove air cavities in said uncured artificial stone mix while said liquid structural foam is expanding and compressing said uncured artificial stone mix.

* * * * *